Figure 1:
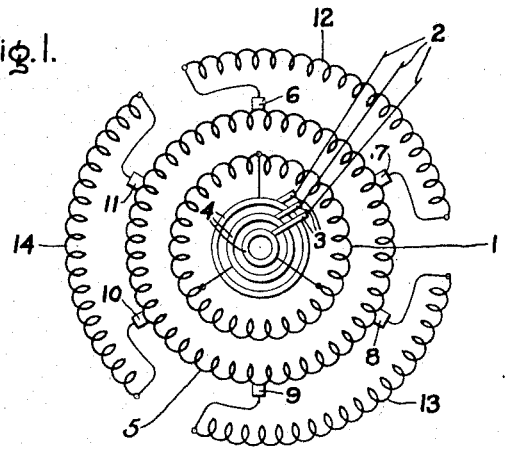

Nov. 8, 1927. 1,643,698

H. SCHRAGE

BRUSH SHIFTING DEVICE FOR ALTERNATING CURRENT MOTORS

Filed June 5, 1924   2 Sheets-Sheet 1

Inventor:
Hidde Schrage,
by *Alexander S. [illegible]*
His Attorney.

Nov. 8, 1927.  H. SCHRAGE  1,648,698
BRUSH SHIFTING DEVICE FOR ALTERNATING CURRENT MOTORS
Filed June 5, 1924   2 Sheets-Sheet 2

Inventor:
Hidde Schrage,
by *Alexander D. Lunt*
His Attorney.

Patented Nov. 8, 1927.

1,648,698

UNITED STATES PATENT OFFICE.

HIDDE SCHRAGE, OF PARIS, FRANCE, ASSIGNOR TO GENERAL ELECTRIC COMPANY, A CORPORATION OF NEW YORK.

BRUSH-SHIFTING DEVICE FOR ALTERNATING-CURRENT MOTORS.

Application filed June 5, 1924, Serial No. 717,968, and in France October 3, 1923.

My invention relates to the speed and power factor control of alternating current motors such, for example, as that disclosed by my reissue Patent No. 14,031, and has for its object the provision of an improved brush shifting mechanism adapted both to control the motor speed and to alter the motor connections in such manner as to enable it to supply its own magnetizing current at different speeds of operation.

My aforementioned reissue patent discloses a motor having upon its rotor member an inducing or primary winding and upon its stator member an induced or secondary winding. Also wound on the rotor member of this motor and inductively related to its primary winding is an auxiliary or regulating winding provided with a commutator arranged to cooperate with pairs of brushes connected to the opposite ends of the different phases of the secondary winding. For the purpose of regulating the speed of the motor, the brushes connected to opposite ends of each phase of the secondary winding are moved in opposite directions to inject into the secondary circuit an electromotive force of slip frequency which for subsynchronous operation is opposed to the slip voltage and for super-synchronous operation is in phase with the slip voltage. The magnitude of this injected electromotive force is determined by the separation of the brushes of each pair and if variation in speed is all that is required it is sufficient to move the brushes of each pair in opposite directions at the same rate of speed. Under these conditions the phase of the injected electromotive force is maintained constant. If it is also desired to arrange the motor for unity power factor operation at all speeds it is necessary to change the phase of the injected electromotive force in such manner as to give it a component of variable magnitude in quadrature with the electromotive force required for speed control. This may be accomplished by shifting the brushes at different rates of speed thereby varying the phase of the injected electromotive force to produce the quadrature component required at each speed.

In a copending application for Letters Patent by John I. Hull, Serial No. 661,769, filed Sept. 10, 1923, which is assigned to the same assignee as the present application there is disclosed a mechanism for shifting the motor brushes in a manner suitable both for speed and power factor control. This mechanism comprises rings each arranged to support a corresponding brush of each brush pair. These rings are interconnected through a pair of gears having projections on their opposed sides arranged to slide in grooves on the opposite sides of a member which is free to slide to and fro in response to rotation of one or the other of the brush rings. The brush shifting mechanism disclosed by the present application is in some respects an improvement on that disclosed by the aforementioned copending application.

My invention will be better understood on reference to the following description when considered in connection with the accompanying drawing and its scope will be pointed out by the appended claims.

Figure 11:
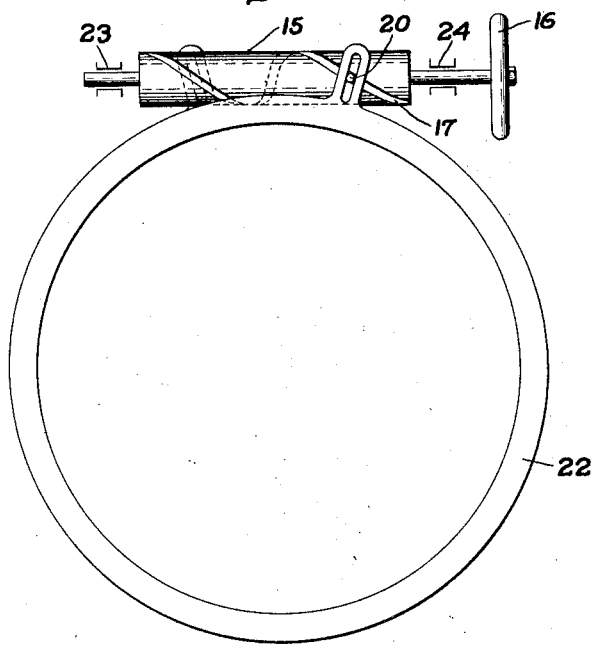
Figure 12:
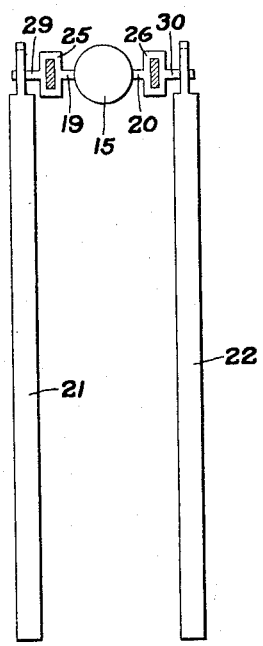
Figure 13:
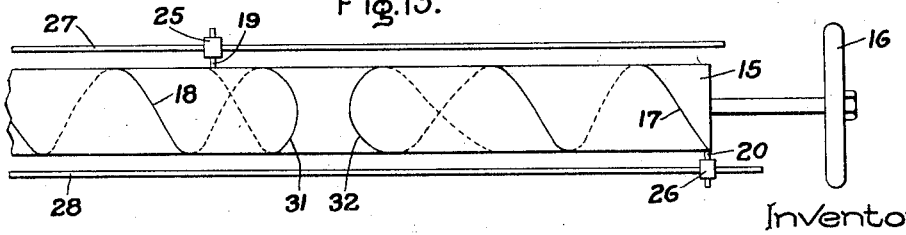

Referring now to the drawing, Fig. 1 shows the connections of a motor such as is disclosed in my reissue Patent No. 14,031; Figs. 2 to 10 inclusive indicate the different voltage relations produced by shifting the brushes from one position to another; and Figs. 11, 12 and 13 are diagrammatic representations of a brush shifting mechanism which may be utilized to shift the brushes in the manner indicated by Figs. 2 to 10 inclusive.

Fig. 1 shows a motor comprising a polyphase primary winding 1 arranged to be supplied with current through leads 2, brushes 3 and slip rings 4. Inductively related with the primary winding 1 and wound upon the same core member is a regulating winding 5 connected with a commutator adapted to cooperate with brushes 6 to 11 inclusive. The phase windings 12, 13 and 14 of the secondary winding of the motor have their ends each connected to a different one of these brushes as indicated by the drawing. For the purpose of shifting the brushes around the commutator two brush rings are provided, the even numbered brushes being supported by one brush ring and the odd numbered brushes being supported by the other brush ring. In the past it has been customary to provide means for moving the brush rings and consequently the brushes of each pair in opposite direction either at the same or at different rates of speed. With the brushes in the position illustrated it may be assumed that an electromotive force opposed to the slip voltage is injected into each phase of the secondary circuit. Under these conditions the speed of the motor is low. In order to increase the motor speed the brush rings may be moved in opposite directions until both brushes of each pair rest on the same commutator bar and each phase of the secondary winding is short-circuited. The motor then operates as an induction motor with short-circuited secondary winding and no electromotive force is injected into the secondary circuit. Upon further movement of the brush rings in the opposite direction a reversed electromotive force is injected into the secondary circuit and the motor is driven at supersynchronous speed.

The quadrature component voltage required to be injected into the secondary circuit to maintain unity power at all speeds has a different value at different speeds and should be maintained through synchronous speed. Where the brushes of each pair pass each other in their movement around the commutator this is obviously impossible. This difficulty may be avoided by shifting the brushes as indicated in Figs. 2 to 10 inclusive each of which indicates a different position of one of the brush pairs.

Figure 2:
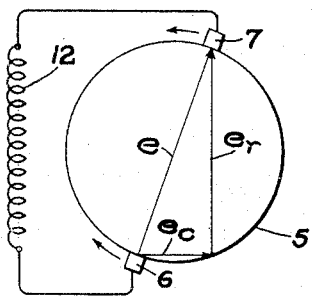
Figure 4:
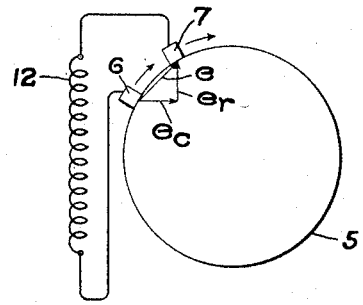
Figure 5:
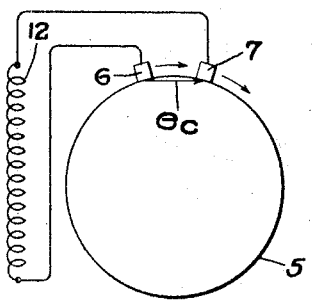

Fig. 2 may be assumed to show the position of the brushes 6 and 7 for the lowest speed of the motor. It will be observed that the brushes 6 and 7 are in a position such that the axis of the secondary winding 12 is displaced relative to that of the regulating winding 5. The voltage between the brushes 6 and 7 may be indicated by the vector $e$ comprising a component $e_r$ suitable for speed control and a component $e_c$ suitable for producing the magnetizing current of the motor. Short arrows are placed near the brushes to indicate the direction of their movement. To increase the speed of the motor to synchronism the brushes are moved to the successive positions indicated by Figs. 2 to 5 inclusive. It will be observed that the speed control component voltage $e_r$ is gradually reduced in value until it disappears and there remains only the quadrature component $e_c$ as shown in Fig. 5. Upon further movement of the brushes to the successive positions indicated by Figs. 6 to 10 inclusive the speed regulating component voltage $e_r$ is increased in the reverse direction and the motor is driven at speeds in excess of synchronism. Throughout this movement the quadrature voltage component is maintained at a value calculated to enable the motor to supply its own magnetizing current. It is thus possible to operate at the desired power factor throughout the entire range of operation and to improve the torque of the motor even at speeds close to synchronism.

Figs. 11, 12 and 13 diagrammatically show a brush shifting mechanism by which the brush rings and consequently the brushes may be shifted in the manner indicated by Figs. 2 to 10 inclusive. This mechanism comprises a cylindrical member 15 arranged to be rotated by a hand wheel 16 and having upon its periphery grooves 17 and 18 arranged to cooperate with pins 19 and 20 for the purpose of rotating the brush rings 21 and 22 in response to manipulation of the hand wheel 16. Suitable bearings 23 and 24 may be provided to support the member 15. The pins 19 and 20 may be supported by the brush ring lugs and arranged to slide to and fro in the slots of these lugs as indicated in Fig. 11 or may be fixed to collars 25 and 26 arranged to slide on bars 27 and 28 respectively, pins 29 and 30 being fixed to the outsides of the collars 25 and 26 respectively to cooperate with grooves of the slip ring lugs.

Figure 3:
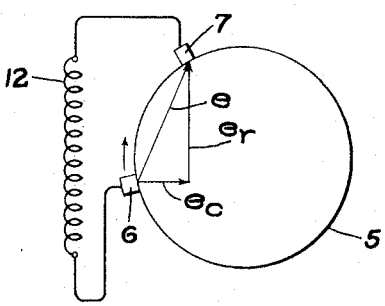
Figure 6:
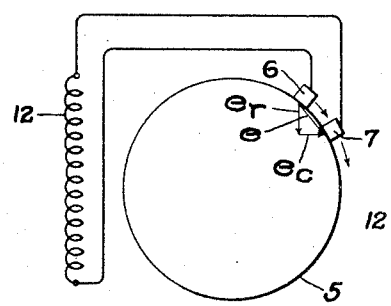
Figure 7:
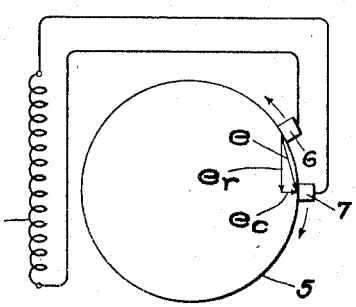
Figure 8:
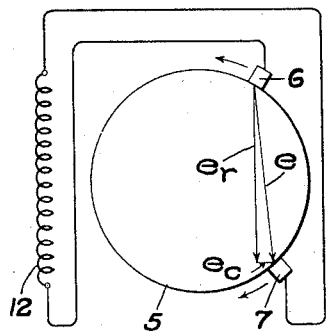
Figure 9:
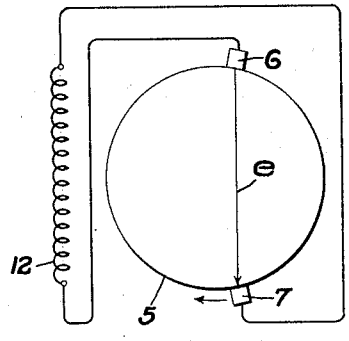
Figure 10:
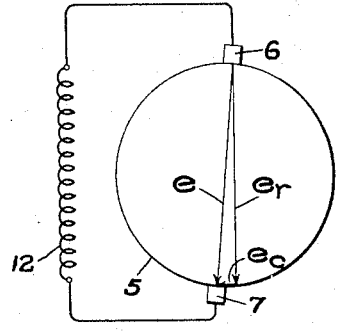

Assuming the collars 25 and 26 to be in the positions indicated in Fig. 13, rotation of the hand wheel 16 in a counterclockwise direction will at first produce rotation of the slip rings 21 and 22 in opposite directions thereby moving the brushes 6 and 7 toward each other as indicated by Fig. 2. This relation between the movements of the two brushes will persist until the pin 19 reaches the point 31 in the groove 18 when motion of the brush 7 will cease as indicated by Fig. 3 and will be reversed as indicated by Fig. 4. Thereafter the brushes continue to move in the same direction as indicated by Figs. 5 and 6 until the point 32 in the groove 17 is reached when the brush 6 stops and starts to move in the reverse direction as indicated by Fig. 7. By continued rotation of the handwheel 16 in a counterclockwise direction the brushes are moved in opposite directions to the successive positions indicated, the relative speeds of the brushes being determined by the pitch of the grooves 17 and 18 which are given the contour necessary to produce the proper values of the components $e_r$ and $e_c$ at the different speeds of the motor.

For the purpose of simplifying the drawing, I have shown a single cylindrical member provided with two grooves which do not cross. It should be observed that the grooves 17 and 18 may overlap or cross each other at a number of points, the cooperating pins being made of elongated shape to cause them to follow the proper groove. In this manner the length of the cylindrical member may be considerably reduced. Furthermore a separate cylindrical member obviously may be arranged to cooperate with each brush ring if desired. It will be readily understood by those skilled in the art that the invention may be embodied in many other forms than those shown and described. I, accordingly, do not wish to be restricted to the particular forms of construction disclosed herein by way of example for the purpose of setting forth my invention in accordance with the patent statutes. The terms of the appended claims are, therefore, not restricted to the precise structure disclosed, but are intended to cover all changes and modifications within the spirit and scope of my invention.

What I claim as new and desire to secure by Letters Patent of the United States, is,—

1. A brush shifting device for commutator type dynamo electric machines comprising a pair of brush supporting rings each provided with a slot, a cylindrical member having peripheral grooves of relatively varying pitch, and means arranged to cooperate with said slots and said grooves to rotate said brush rings in response to the movement of said cylindrical member and the pitch of said grooves.

2. A brush shifting device for commutator type dynamo electric machines comprising a pair of brush supporting rings each provided with a slot, a cylindrical member having peripheral grooves, and means arranged to cooperate with said slots and said grooves to rotate said brush rings in response to the movement of said cylindrical member.

3. A brush shifting device for commutator type dynamo electric machines comprising a pair of brush supporting rings each provided with a slot, a rotatable member provided with peripheral grooves, a collar having projections at its opposite sides, one of said projections being arranged to cooperate with one of said slots and the other of said projections being arranged to cooperate with one of said grooves, and a support along which said collar is arranged to move in response to movement of said rotatable member.

In witness whereof, I have hereunto set my hand this 20th day of May, 1924.

HIDDE SCHRAGE.